(12) United States Patent
Wang et al.

(10) Patent No.: US 7,944,620 B2
(45) Date of Patent: May 17, 2011

(54) ZOOM LENS

(75) Inventors: Kuo-Chuan Wang, Hsinchu (TW); Ching-Lung Lai, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 73 days.

(21) Appl. No.: 12/564,249

(22) Filed: Sep. 22, 2009

(65) Prior Publication Data

US 2010/0182677 A1  Jul. 22, 2010

(30) Foreign Application Priority Data

Jan. 22, 2009 (TW) .............................. 98102564 A

(51) Int. Cl.
*G02B 15/14* (2006.01)

(52) U.S. Cl. ......... 359/682; 359/680; 359/691; 359/676

(58) Field of Classification Search .................. 359/680, 359/681, 682, 691
See application file for complete search history.

(56) References Cited

U.S. PATENT DOCUMENTS

| | | | |
|---|---|---|---|
| 5,546,232 A | 8/1996 | Hirakawa | |
| 5,552,937 A | 9/1996 | Ono et al. | |
| 6,137,638 A | 10/2000 | Yamagishi et al. | |
| 6,809,882 B2 | 10/2004 | Takatsuki | |
| 6,839,183 B2 | 1/2005 | Ohashi | |
| 6,888,682 B2 | 5/2005 | Kawakami | |
| 6,917,477 B2 | 7/2005 | Takatsuki | |
| 7,061,687 B2 | 6/2006 | Adachi | |
| 7,075,729 B2 | 7/2006 | Wang | |
| 7,075,733 B2 | 7/2006 | Itoh | |
| 7,405,885 B2 * | 7/2008 | Kang et al. | 359/681 |
| 7,450,320 B2 * | 11/2008 | Kang et al. | 359/691 |
| 7,466,494 B2 * | 12/2008 | Kuo | 359/680 |
| 7,505,209 B2 * | 3/2009 | Kang et al. | 359/649 |
| 7,643,220 B2 * | 1/2010 | Chen et al. | 359/680 |
| 7,787,191 B2 * | 8/2010 | Wang | 359/682 |

FOREIGN PATENT DOCUMENTS

| | | |
|---|---|---|
| TW | M281179 | 11/2005 |
| TW | I257009 | 6/2006 |

* cited by examiner

*Primary Examiner* — David N Spector
(74) *Attorney, Agent, or Firm* — J.C. Patents

(57) ABSTRACT

A zoom lens includes a first lens group and a second lens group disposed between the first lens group and an image side. The first lens group has three lenses. Refractive powers of the three lenses arranged from an object side to the image side are respectively negative, negative, and positive. The second lens group has five lenses. Refractive powers of the five lenses arranged from the object side to the image side are respectively positive, negative, positive, negative, and positive. Effective focal lengths (EFL) of the first and the second groups are respectively f1 and f2. The EFL of the zoom lens is $f_w$ when the zoom lens is switched to a wide end. The zoom lens satisfies $-2.8 < f1/f_w < -2.5$ and $0.75 < |f1/f2| < 0.9$.

19 Claims, 10 Drawing Sheets

ZOOM LENS

CROSS-REFERENCE TO RELATED APPLICATION

This application claims the priority benefit of Taiwan application serial no. 98102564, filed on Jan. 22, 2009. The entirety of the above-mentioned patent application is hereby incorporated by reference herein and made a part of specification.

BACKGROUND OF THE INVENTION

1. Field of the Invention

The invention relates to a lens. More particularly, the invention relates to a zoom lens.

2. Description of Related Art

Referring to FIG. 1, a zoom lens 100 disclosed in U.S. Pat. No. 5,552,937 includes a first lens group 110 and a second lens group 120. The first lens group 110 is composed of three lenses 112, 114, 116, and the second lens group 120 is composed of four lenses 122, 124, 126, 128. In the zoom lens 100, in order to eliminate image aberration and chromatic aberration, more than one aspheric lens is used in the first lens group 110 and the second lens group 120. That is, many aspheric lenses are used in the zoom lens 100 to achieve a wide angle.

Although the aspheric lens has a fine effect for rectifying image aberration, a strict tolerance requirement is brought forward in the mass production when too many aspheric lenses are used. If the tolerance is not controlled in the mass production, the overall yield is reduced. Moreover, since the aspheric lens has a high cost, the cost of the zoom lens 100 is increased if too many aspheric lenses are used in the zoom lens 100.

Referring to FIG. 2, a zoom lens 200 disclosed in U.S. Pat. No. 6,839,183 includes a first lens group 210, a second lens group 220, and a third lens group 230. The first lens group 210 is composed of three lenses 212, 214, 216, the second lens group 220 is composed of three lenses 222, 224, 226, and the third lens group 230 is composed of one lens 232. Moreover, the zoom lens 200 further includes an aperture stop 240 movably disposed between the first lens group 210 and the second lens group 220.

During the zoom lens 200 zooms in/zooms out, the aperture stop 240 moves together, thus the interlinking mechanism of the zoom lens 200 is quite complicated. Thereby, not only the volume of the zoom lens 200 is enlarged, but also the manufacturing cost of the zoom lens 200 is increased.

SUMMARY OF THE INVENTION

The invention provides a zoom lens having advantages of an infrared correction, a large aperture, a wide viewing angle, and a small size.

Additional aspects and advantages of the invention will be set forth in the description of the techniques disclosed in the invention.

The invention provides a zoom lens including a first lens group and a second lens group. The first lens group has a negative refractive power and includes a first lens, a second lens, and a third lens arranged in order from an object side to an image side. Refractive powers of the first lens, the second lens, and the third lens are respectively negative, negative, and positive. The second lens group has a positive refractive power and is disposed between the first lens group and the image side. The second lens group includes a fourth lens, a fifth lens, a sixth lens, a seventh lens, and an eighth lens arranged in order from the object side to the image side. Refractive powers of the fourth lens, the fifth lens, the sixth lens, the seventh lens, and the eighth lens are respectively positive, negative, positive, negative, and positive. An effective focal length of the first lens group is f1, and an effective focal length of the second lens group is f2. The first lens group and the second lens group are capable of moving between the object side and the image side to make the zoom lens be switched between a wide end and a tele end. An effective focal length of the zoom lens is $f_w$ when the zoom lens is switched to the wide end. The zoom lens satisfies $-2.8 < f1/f_w < -2.5$ and $0.75 < |f1/f2| < 0.9$.

In an embodiment of the invention, the first lens, the second lens, and the third lens are each a spherical lens, and at least one of the fourth lens, the fifth lens, the six lens, the seventh lens, and the eighth lens is an aspheric lens. In an embodiment of the invention, the fourth lens is the aspheric lens.

In an embodiment of the invention, the first lens, the second lens, and the third lens are respectively a convex-concave lens having a convex surface facing to the object side, a biconcave lens, and a concave-convex lens having a concave surface facing to the image side. In another embodiment of the invention, the first lens, the second lens, and the third lens are respectively a convex-concave lens having a convex surface facing to the object side, a biconcave lens, and a plano-convex lens having a convex surface facing to the object side.

In an embodiment of the invention, the fifth lens and the sixth lens form a first double cemented lens. In an embodiment of the invention, the Abbe number of at least one of the fifth lens and the sixth lens is greater than 80. In an embodiment of the invention, the seventh lens and the eighth lens form a second double cemented lens. In an embodiment of the invention, the Abbe number of at least one of the fifth lens, the sixth lens, the seventh lens, and the eighth lens is greater than 65.

In an embodiment of the invention, the fourth lens, the fifth lens, the sixth lens, the seventh lens, and the eighth lens are respectively a biconvex lens, convex-concave lens having a convex surface facing to the object side, a biconvex lens, a convex-concave lens having a convex surface facing to the object side, and a concave-convex lens having a concave surface facing to the image side.

In an embodiment of the invention, the zoom lens is switched from the tele end towards the wide end when the first lens group and the second lens group are moved far away from one another. In an embodiment of the invention, the zoom lens is switched from the wide end towards the tele end when the first lens group and the second lens group are moved closer to one another.

In an embodiment of the invention, the zoom lens further includes an aperture stop. The aperture stop is disposed between the first lens group and the second lens group, the aperture stop has a fixed position relative to the zoom lens. In an embodiment of the invention, a distance between the aperture stop and an image surface located at the image side is D, a distance between the image surface and an intersection point intersected between a surface of the first lens facing to the object side and an optical axis of the zoom lens is $T_1$ when the zoom lens is switched to the wide end, and $D/T_1 > 0.5$. In an embodiment of the invention, a distance between the image surface and an intersection point intersected between a surface of the first lens facing to the object side and an optical axis of the zoom lens is $T_2$ when the zoom lens is switched to the tele end, and $D/T_2 > 0.6$.

In an embodiment of the invention, the first lens has a first surface facing to the object side and a second surface facing to the image side. A clear aperture of the second surface is $C_{21}$, a radius of curvature of the second surface is $R_{21}$, and $C_{21}/R_{21}<0.92$. In an embodiment of the invention, a ratio between an optical distortion of a 70% image height and an optical distortion of a 100% image height on an image surface located at the image side is x when the zoom lens is switched to the wide end, and $0.4 \leq x \leq 0.5$.

In an embodiment of the invention, a material of the first lens, the second lens, the third lens, the fourth lens, the fifth lens, the sixth lens, the seventh lens, and the eighth lens includes glass or plastic.

In an embodiment of the invention, the zoom lens further includes an infrared (IR) cut filter disposed between the third lens and the fourth lens.

In the zoom lens of the embodiment of the invention, based on a combination of the negative and positive refractive powers of the first lens group and the second lens group, and in coordination with relatively less aspheric lenses, an image aberration phenomenon may be effectively reduced, and a wide viewing angle may be achieved. Moreover, during a zoom process of the zoom lens of the embodiment of the invention, a position of the aperture stop is fixed, so that a design of a linking-up mechanism is relatively simple. In addition, since a part of the lenses of the second lens group has relatively high Abbe number, when the infrared cut filter is switched on/off, during imaging processes of a visible light and a near infrared light, focal planes thereof may be a same plane, so as to effectively reduce a chromatic aberration phenomenon. Therefore, the zoom lens not only has a small size and a lower production cost, but also has a better imaging quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component, is directly "adjacent to" "B" component or one or more additional components are between "A" component and "B" component. Accordingly, the drawings and descriptions will be regarded as illustrative in nature and not as restrictive.

First Embodiment

Figure 1:
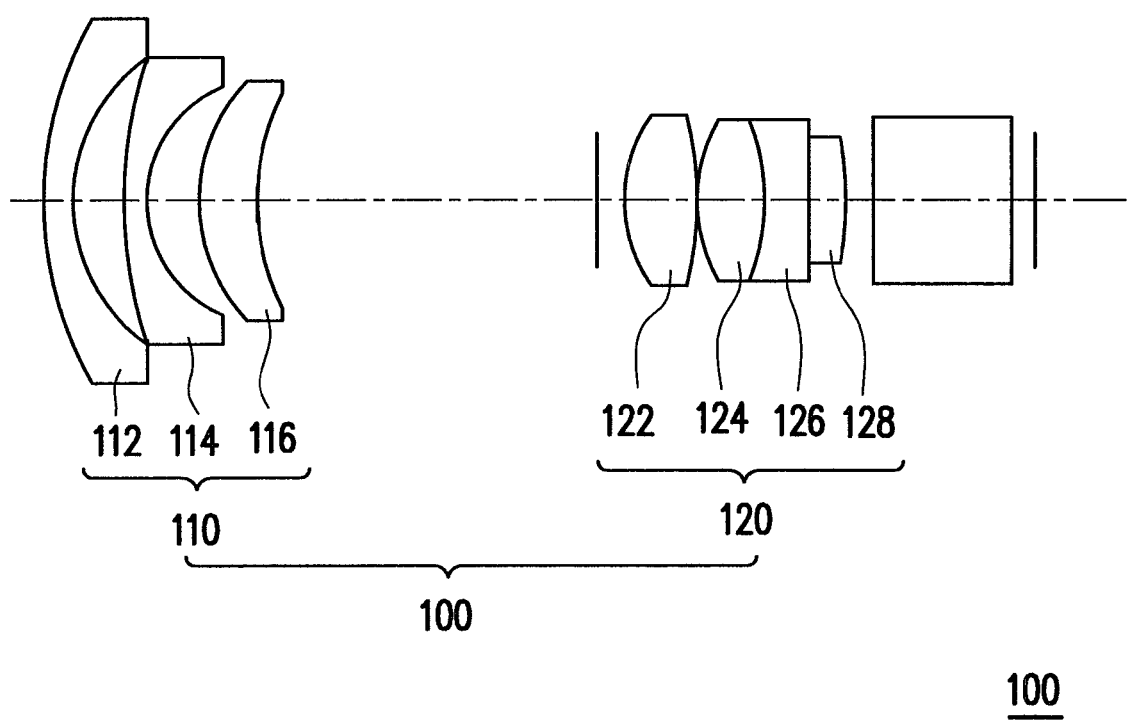
FIG. 1 is a schematic view of a conventional zoom lens.
Figure 2:
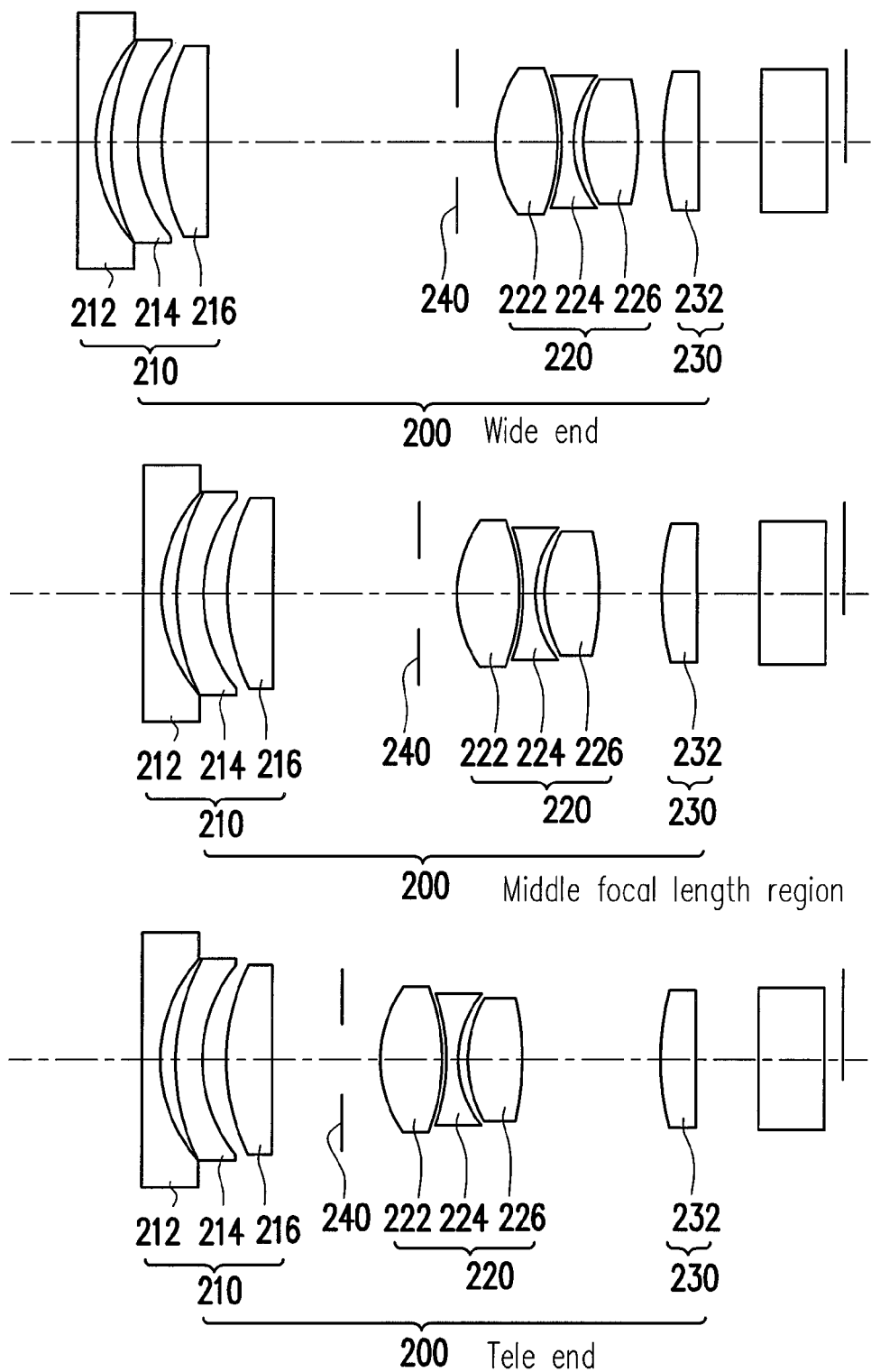
FIG. 2 is a schematic view of a conventional zoom lens having a focal length of a wide end, a middle focal length region, and a tele end.
Figure 3A:
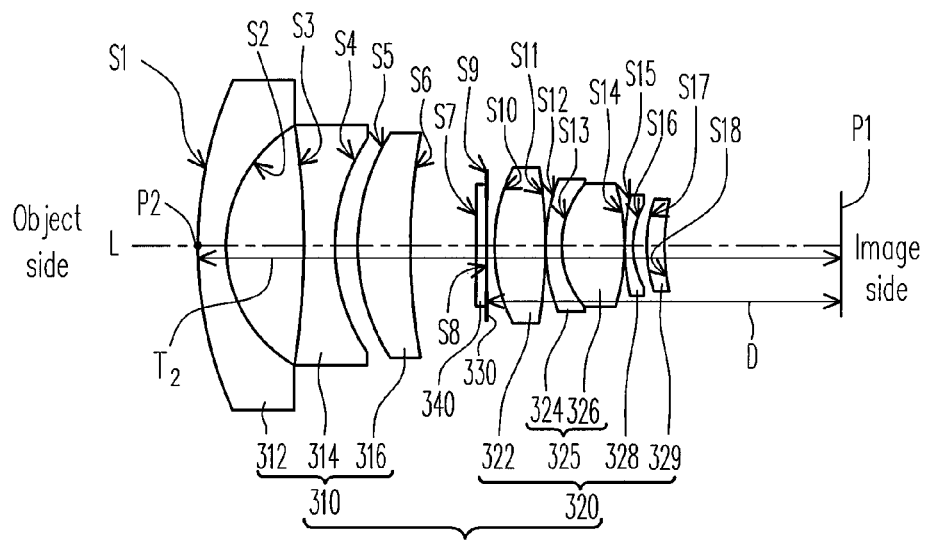
FIGS. 3A-3C are schematic diagrams of a zoom lens when a focal length thereof corresponds to a tele end, a middle focal length region, and a wide end according to an embodiment of the invention.
Figure 3B:
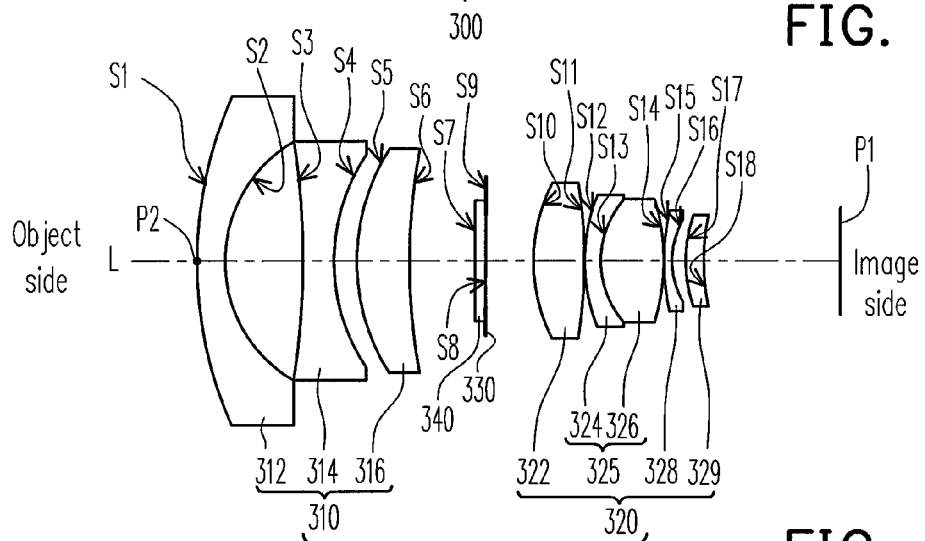
Figure 3C:
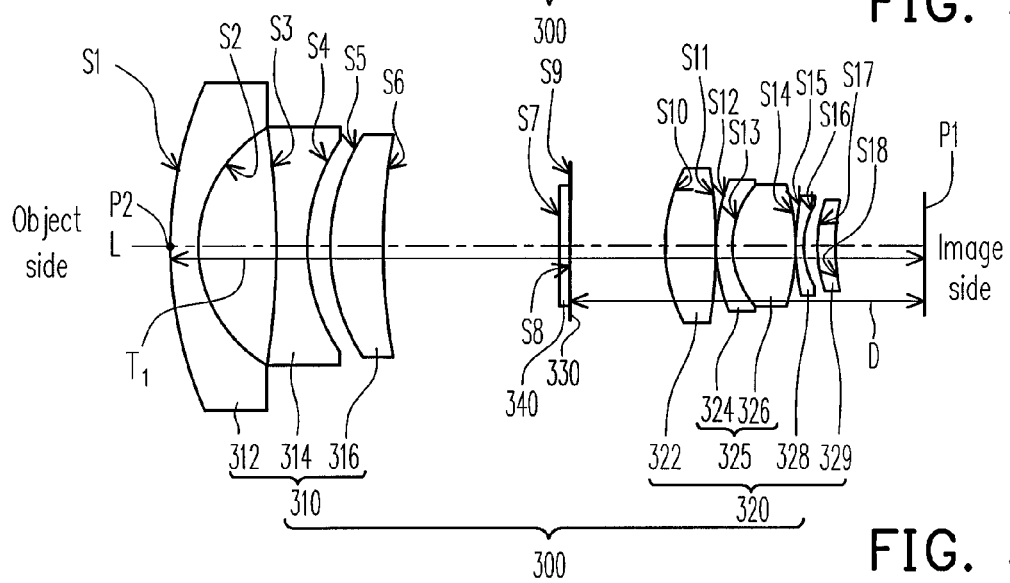

FIGS. 3A-3C are schematic diagrams of a zoom lens when a focal length thereof corresponds to a tele end, a middle focal length region, and a wide end according to the first embodiment of the invention. Referring to FIGS. 3A-3C, the zoom lens 300 includes a first lens group 310 and a second lens group 320. Refractive powers of the first lens group 310 and the second lens group 320 are respectively negative and positive. The first lens group 310 includes a first lens 312, a second lens 314, and a third lens 316 arranged in order from an object side to an image side. Refractive powers of the first lens 312, the second lens 314, and the third lens 316 are respectively negative, negative, and positive. The second lens group 320 is disposed between the first lens group 310 and the image side. The second lens group 320 includes a fourth lens 322, a fifth lens 324, a sixth lens 326, a seventh lens 328, and an eighth lens 329 arranged in order from the object side to the image side. Refractive powers of the fourth lens 322 to the eighth lens 329 are respectively positive, negative, positive, negative, and positive. An effective focal length of the first lens group 310 is f1, and an effective focal length of the second lens group 320 is f2. The first lens group 310 and the second lens group 320 are capable of moving between the object side and the image side to the make zoom lens 300 be switched between a wide end and a tele end. When the zoom lens 300 is switched towards the wide end, an effective focal length of the zoom lens 300 is $f_w$, and the zoom lens 300 satisfies $-2.8<f1/f_w<-2.5$ and $0.75<|f1/f2|<0.9$. In the present embodiment, a material of the first lens 312 to the eighth lens 329 is, for example, glass or plastic.

In the zoom lens 300, the first lens 312, the second lens 314, and the third lens 316 are, for example, spherical lenses. At least one of the fourth lens 322, the fifth lens 324, the sixth lens 326, the seventh lens 328, and the eighth lens 329 is an aspheric lens. In the present embodiment, the fourth lens 322 is, for example, the aspheric lens.

In the present embodiment, the first lens 312 is, for example, a convex-concave lens having a convex surface (a surface S1) facing to the object side, the second lens 314 is a biconcave lens, and the third lens 316 is a concave-convex lens having a concave surface (a surface S6) facing to the image side. Moreover, the fourth lens 322 is a biconvex lens, the fifth lens 324 is a convex-concave lens having a convex surface (a surface S12) facing to the object side, the sixth lens 326 is a biconvex lens, the seventh lens 328 is a convex-concave lens having a convex surface (a surface S15) facing to the object side, and the eighth lens 329 is a concave-convex lens having a concave surface (a surface S18) facing to the image side. In the present embodiment, the first lens 312 has a first surface (the surface S1) facing to the object side and a second surface (a surface S2) facing to the image side. A clear aperture of the second surface S2 of the first lens 312 is $C_{21}$. In detail, the clear aperture relates an amount of light passing through the second surface S2. A radius of curvature of the second surface S2 is $R_{21}$, and $C_{21}/R_{21}<0.92$.

In the present embodiment, the fifth lens 324 and the sixth lens 326 form a first double cemented lens 325, wherein a surface of the fifth lens 324 facing to the image side and a surface (i.e. a surface S13) of the sixth lens 326 facing to the object side have the same radius of curvature. Moreover, the Abbe number of at least one of the fifth lens 324 and the sixth lens 326 is greater than 80, and in the present embodiment, the Abbe number of the sixth lens 326 is greater than 80. In detail, since the Abbe number of the sixth lens 326 is greater than 80, when lights with different wavelengths pass through the sixth lens 326, a chromatic dispersion degree thereof is relatively small. Therefore, when the zoom lens 300 is used for imaging under visible light and infrared light, imaging positions of different wavelengths are focused to a same plane, so as to eliminate a chromatic aberration phenomenon. A material of the sixth lens 326 of the present embodiment is, for example, an extra low dispersion glass (ED glass) material. Moreover, the zoom lens 300 further includes an aperture stop 330 disposed between the first lens group 310 and the second lens group 320, and the aperture stop 330 has a fixed position relative to the zoom lens 300.

When the first lens group 310 and the second lens group 320 are moved closer to one another, the zoom lens 300 is switched from the wide end towards the tele end. Namely, a focal length of the zoom lens 300 is changed from the wide end to the middle focal length region or is changed from the middle focal length region to the tele end. Conversely, when the first lens group 310 and the second lens group 320 are moved far away from one another, the zoom lens 300 is switched from the tele end towards the wide end. Namely, the focal length of the zoom lens 300 is changed from the middle focal length region to the wide end or is changed from the tele end to the middle focal length region. It should be noted that during a zoom process, the position of the aperture stop 330 related to the zoom lens 300 is fixed.

In the present embodiment, a distance between the aperture stop 330 and an image surface P1 located at the image side is D, and when the zoom lens 300 is switched to the wide end, a distance between the image surface P1 and an intersection point P2 interested between the surface S1 of the first lens 312 facing to the object side and an optical axis L of the zoom lens 300 is $T_1$, and $D/T_1>0.5$. When the zoom lens 300 is switched to the tele end, a distance between the image surface P1 and the intersection point P2 interested between the surface S1 of the first lens 312 facing to the object side and the optical axis L is $T_2$, and $D/T_2>0.6$. By such means, a thickness of the zoom lens 300 may be limited, so as to reduce a size of the zoom lens 300.

Moreover, when the zoom lens 300 is switched to the wide end, a ratio between an optical distortion of a 70% image height and an optical distortion of a 100% image height on the image surface P1 located at the image side is x, and $0.4 \leqq x \leqq 0.5$. In other words, the zoom lens 300 may have a better imaging quality during the zoom process.

In the present embodiment, the zoom lens 300 further includes an infrared cut filter 340 disposed between the third lens 316 and the fourth lens 322. In the present embodiment, the infrared cut filter 340 is located between the third lens 316 and the aperture stop 330, and leans against the aperture stop 330 as that shown in FIG. 3A. In detail, when the zoom lens 300 is used in the day light, the infrared cut filter 340 located between the third lens 316 and the aperture stop 330 may filter most of infrared light, and an object beam (not shown) come from the object side may be imaged on the image surface P1, wherein the light imaged on the image surface P1 is mainly visible light. However, when the zoom lens 300 is used in the night, since the visible light come from the object side is relatively weak, the infrared cut filter 340 located between the third lens 316 and the aperture stop 330 may be removed to image the infrared light come from the object side on the image surface P1. However, a general lens may have a chromatic dispersion function for different wavelengths, so that the visible light and the infrared light may not be focused on a same plane, and may lead to a chromatic aberration phenomenon. To resolve the chromatic aberration problem, in the present embodiment, the Abbe number of the sixth lens 326 (or the fifth lens 324) used in the second lens group 320 is greater than 80, so that when the zoom lens 300 is used in the day light or in the night, the zoom lens 300 may maintain a better imaging quality.

In the present embodiment, since the zoom lens 300 is a combination of seven spherical lenses and one aspheric lens, and the refractive powers of the first lens group 310 and the second lens group 320 are respectively negative and positive, the image aberration phenomenon may be mitigated and the wide viewing angle purpose may be achieved, wherein the zoom lens 300 satisfies $-2.8<f1/f_w<-2.5$ and $0.75<|f1/f2|<0.9$. Moreover, since the number of the aspheric lenses used is relatively less, a cost of the aspheric lens may be saved, and a production yield may be increased. In addition, during the zoom process, the position of the aperture stop 330 is fixed, so that a linking-up mechanism of the zoom lens 300 is relatively simple, and accordingly not only a cost of the zoom lens 300 is reduced, but also the zoom lens 300 may have a small size.

Accordingly, the zoom lens 300 has characteristics of a wide viewing angle and a large aperture. The function of the first lens group 310 is focus, and the function of the second lens group 320 is zoom. Moreover, since the Abbe number of at least one of the fifth lens 324 and the sixth lens 326 is greater than 80, the chromatic aberration phenomenon may be effectively eliminated.

An embodiment of the zoom lens 300 is provided below, though data provided below is not used for limiting the invention, and those skilled in the art may suitably modify parameters or settings of the following embodiment with reference of the invention without departing from the scope or spirit of the invention.

TABLE 1

| Surface | Radius of Curvature (mm) | Interval (mm) | Refractive Index | Abbe Number | Remarks |
|---|---|---|---|---|---|
| Object Side | Infinity | Infinity | | | |
| S1 | 21.36 | 1 | 1.7725 | 49.5 | First lens |
| S2 | 6.76 | 4.65 | | | |
| S3 | −42.5 | 1 | 1.72 | 50.2 | Second lens |
| S4 | 9.52 | 1.42 | | | |
| S5 | 11.4 | 2 | 1.9229 | 18.8 | Third lens |
| S6 | 24.64 | Variable Interval (d1) | | | |
| S7 | Infinity | 0.175 | 1.5163 | 64.1 | infrared cut filter |
| S8 | Infinity | 0 | | | |
| S9 | Infinity | Variable Interval (d2) | | | Aperture stop |
| S10 | 7.79 | 2.83 | 1.5809 | 58.9 | Fourth lens |
| S11 | −25.82 | 0.18 | | | |
| S12 | 14.9 | 0.9 | 1.801 | 34.9 | Fifth lens |
| S13 | 5.8 | 4.5 | 1.497 | 81.5 | Sixth lens |
| S14 | −10.29 | 0.2 | | | |
| S15 | 24.46 | 0.9 | 1.8467 | 23.7 | Seventh lens |
| S16 | 5.6 | 0.97 | | | |
| S17 | 7.52 | 1.6 | 1.7618 | 26.5 | Eighth lens |
| S18 | 29.75 | Variable Interval (d3) | | | |
| Image Side | Infinity | | | | |

In the table 1, the radius of curvature represents a radius curvature of each surface, and the interval represents a distance between two adjacent surfaces. For example, an interval of the surface S1 represents a distance between the surface S1 and the surface S2. The thickness, the refractive index, and the Abbe number of each lens in the remark column correspond to values of the space, the refractive index, and the Abbe number in the same row. Moreover, the surfaces S1 and S2 are two surfaces of the first lens 312, the surfaces S3 and S4 are two surfaces of the second lens 314, and the surfaces S5 and S6 are two surfaces of the third lens 316. The surface S7 and S8 are two surfaces of the infrared cut filter, and the surface S9 is a surface of the aperture stop 330. The surfaces S10 and S11 are two surfaces of the fourth lens 322, the surface S12 is a surface of the fifth lens 324 facing to the object side, the surface S13 is a contact surface between the fifth lens 324 and the sixth lens 326, the surface S14 is a surface of the sixth lens 326 facing to the image side, the surfaces S15 and S16 are two surfaces of the seventh lens 328, and the surfaces S17 and S18 are two surfaces of the eighth lens 329. In the present embodiment, when the zoom lens 300 is used for imaging, an image sensing device, for example, a charge coupled device (CCD) image sensing device or a complementary metal-oxide semiconductor (CMOS) image sensing device may be disposed at the image side.

According to the above description, the surfaces S10 and S11 are aspheric surfaces, and an equation of the aspheric surface is as follows:

$$X = \frac{(1/R)H^2}{1+\sqrt{1-(1+K)(H/R)^2}} + AH^4 + BH^6 + CH^8 + DH^{10}$$

where X is a sag along the optical axis L; R is the radius of an osculating sphere, i.e., the radius of curvature close to the optical axis L (the radius of curvatures of S10 and S11). K is a conic constant and H is an aspheric height, i.e., the height from the center to the edge of the lens. It may be known from the formula that different H values are corresponding to different X values. A, B, C, and D are aspheric coefficients. The aspheric coefficients and the K values of the surfaces S10 and S11 are shown in table 2:

TABLE 2

| Surface | K | A | B | C | D |
|---|---|---|---|---|---|
| S10 | 0 | −0.0003 | 1.4485E−06 | 1.5341E−07 | −6.1572E−09 |
| S11 | 0 | 0.0004 | 2.6137E−06 | 1.9779E−07 | −7.8248E−09 |

TABLE 3

| | | Wide end | Middle Focal Length Region | Tele end |
|---|---|---|---|---|
| Effective Focal Length (mm) | | 2.8 | 5 | 9 |
| F number | | 1.4 | 1.8 | 2.9 |
| Field of View (degree) | | 127.5 | 68.7 | 38 |
| Variable Interval (mm) | d1 | 12.63 | 4.1389 | 2.9146 |
| | d2 | 7.9537 | 5.1876 | 0.0998 |
| | d3 | 5.5701 | 8.336 | 13.4254 |

In the table 3, values of the zoom lens 300 when the focal length thereof corresponds to the wide end, middle focal length region, and the tele end are listed, and the values of the zoom lens 300 include effective focal length (EFL), field of view (FOV), F number, and variable intervals d1, d2, and d3.

Since the F number of the zoom lens 300 may be as small as 1.4, the zoom lens 300 has the advantage of the large aperture. Moreover, since the FOV of the zoom lens 300 at the wide end may reach 127.5, the zoom lens 300 has the advantage of the wide viewing angle.

Figure 4A:
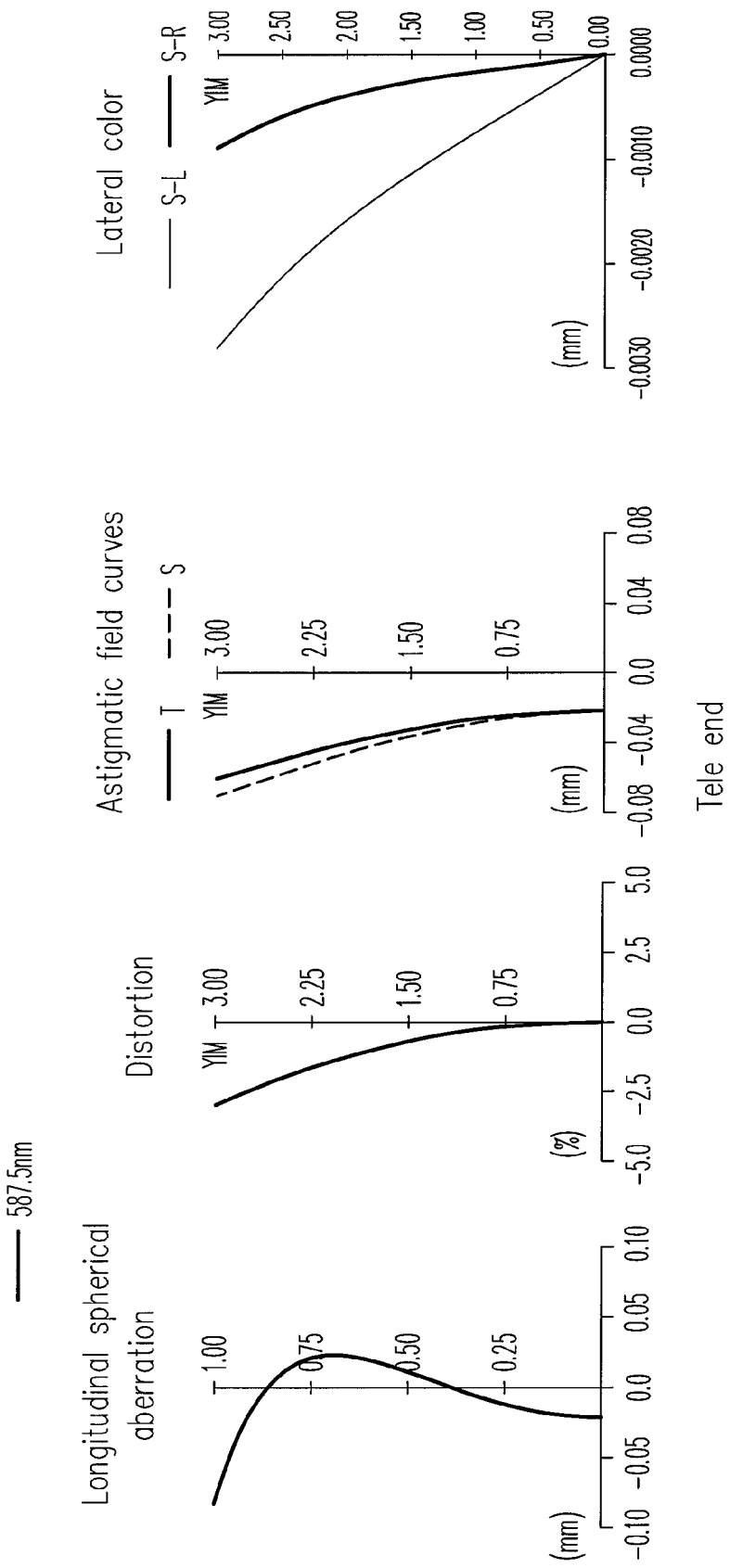
FIGS. 4A-4C are respectively optical quality reference diagrams of a zoom lens of FIG. 3A-3C in case that a focal length thereof corresponds to a tele end, middle focal length region, and a wide end.
Figure 4B:
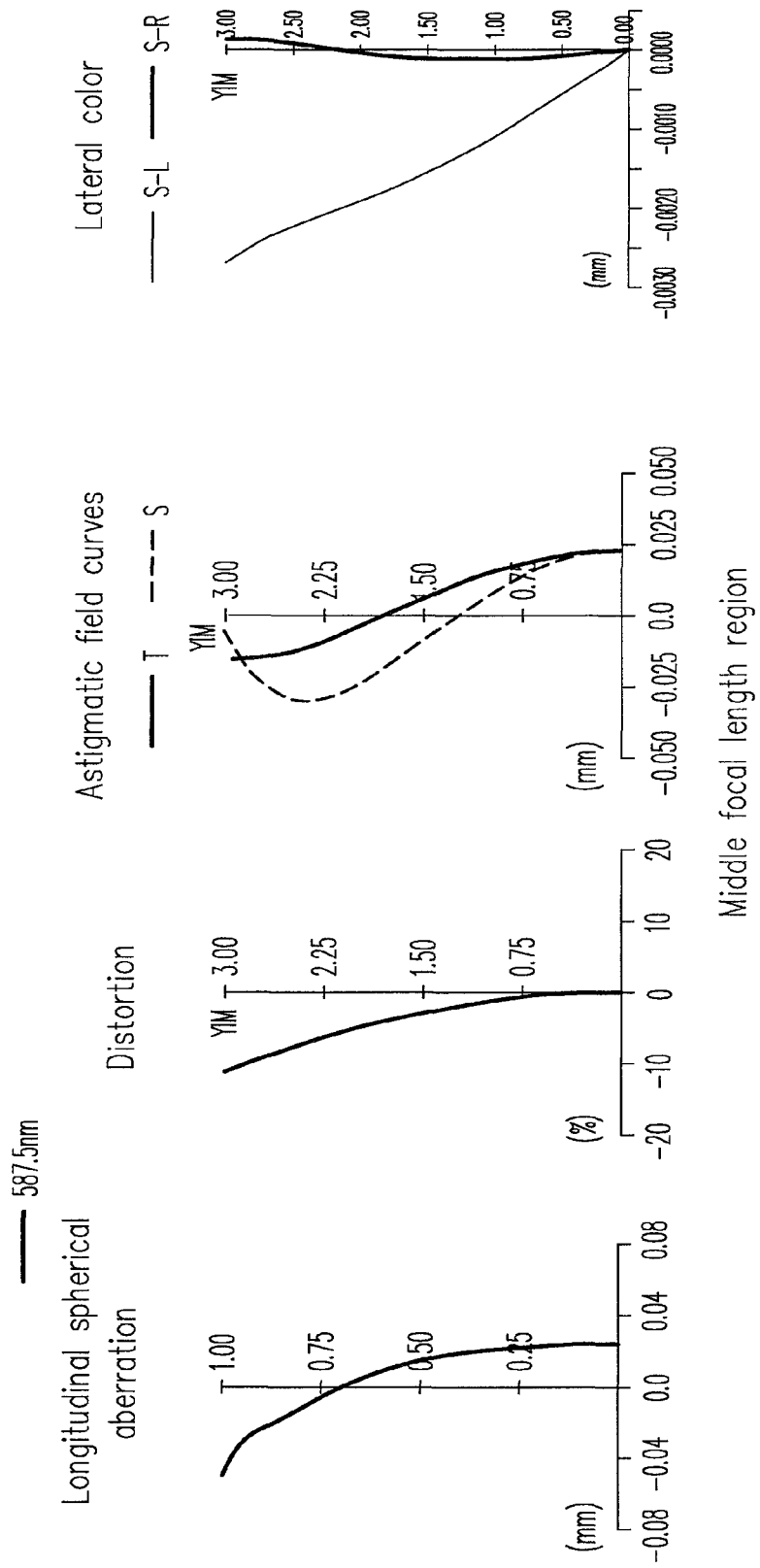
Figure 4C:
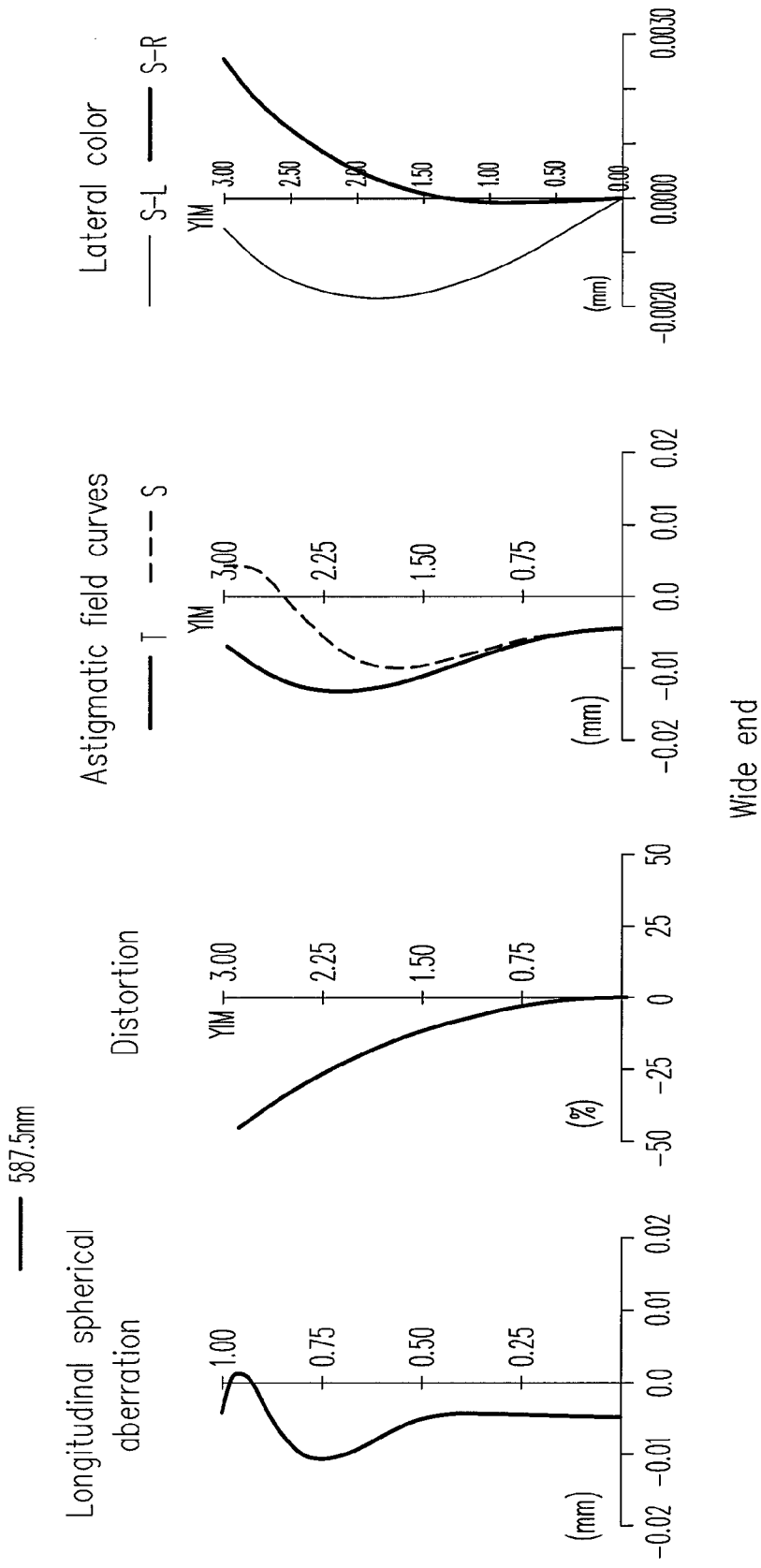

According to a longitudinal spherical aberration diagram, a distortion diagram, astigmatic field curves diagram, and a lateral color diagram of FIGS. 4A-4C, it is know that when the focal length of the zoom lens 300 corresponds to the tele end, the middle focal length region, and the wide end, the zoom lens 300 all have a good imaging quality. Therefore, the zoom lens 300 of the present embodiment may have the advantages of the small size and the low cost while maintaining the fine imaging quality.

Second Embodiment

Figure 5A:
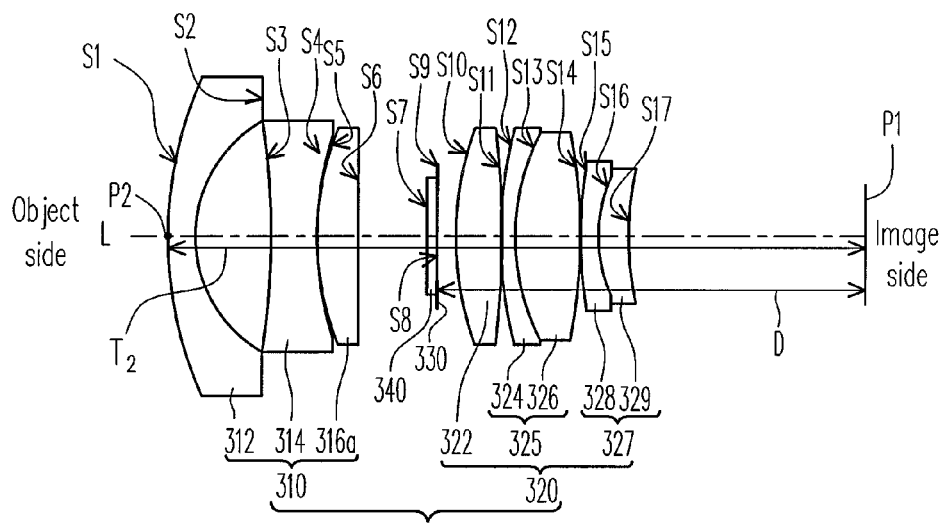
FIGS. 5A-5C are schematic diagrams of a zoom lens when a focal length thereof corresponds to a tele end, a middle focal length region, and a wide end according to another embodiment of the invention.
Figure 5B:
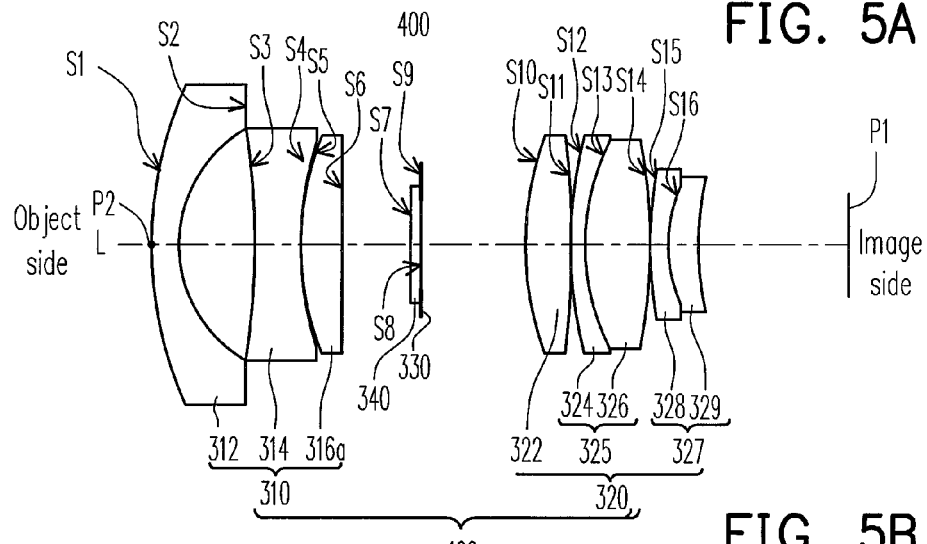
Figure 5C:
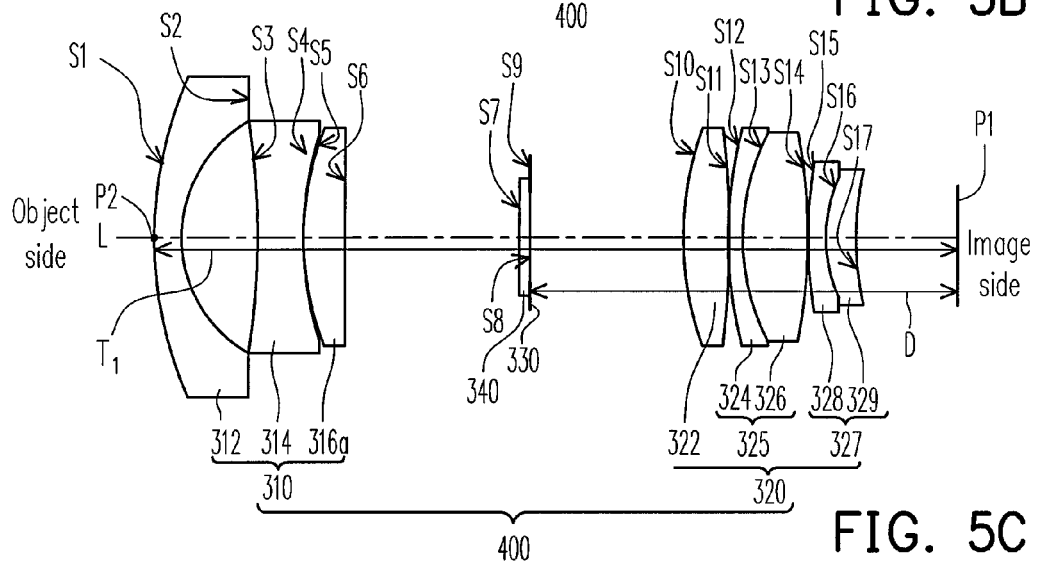

FIGS. 5A-5C are schematic diagrams of a zoom lens when a focal length thereof corresponds to a tele end, a middle focal length region, and a wide end according to the second embodiment of the invention. Referring to FIGS. 5A-5C and FIGS. 3A-3C, the zoom lens 400 of the present embodiment is similar to the zoom lens 300 of the aforementioned embodiment, and a difference there between is that a third lens 316a is a plano-convex lens having a convex surface facing to the object side, and the seventh lens 328 and the eighth lens 329 form a second double cemented lens 327, wherein the Abbe number of at least one of the fifth lens 324, the sixth lens 326, the seventh lens 328, and the eighth lens 329 is greater than 65. In the present embodiment, the Abbe number of the eighth lens 329 is greater than 65.

In the present embodiment, structures of the zoom lens 400 and the zoom lens 300 are similar, so that the zoom lens 400 also has the advantages that the zoom lens 300 has, and detailed description thereof is not repeated.

Similarly, an embodiment of the zoom lens 400 is provided below, though data provided below is not used for limiting the invention, and those skilled in the art can suitably modify parameters or settings of the following embodiment with reference of the invention without departing from the scope or spirit of the invention.

TABLE 4

| Surface | Radius of Curvature (mm) | Interval (mm) | Refractive Index | Abbe Number | Remarks |
|---|---|---|---|---|---|
| Object Side | Infinity | Infinity | | | |
| S1 | 26.08 | 1 | 1.834 | 37.1 | First lens |
| S2 | 5.62 | 4.0909 | | | |
| S3 | −19.18 | 1 | 1.804 | 46.5 | Second lens |
| S4 | 22.12 | 0.1 | | | |
| S5 | 14.42 | 2.1652 | 1.9229 | 18.8 | Third lens |
| S6 | Infinity | Variable Interval (d1) | | | |
| S7 | Infinity | 0.175 | 1.5168 | 64.1 | infrared cut filter |
| S8 | Infinity | 0 | | | |
| S9 | Infinity | Variable Interval (d2) | | | Aperture stop |
| S10 | 10.32 | 2.6204 | 1.6899 | 52.5 | Fourth lens |
| S11 | −63.98 | 0.1 | | | |
| S12 | 15.47 | 1. | 1.8467 | 23.7 | Fifth lens |
| S13 | 7.26 | 4.1 | 1.6968 | 55.5 | Sixth lens |
| S14 | −16.93 | 0.1 | | | |
| S15 | 21.09 | 1.2726 | 1.8340 | 37.1 | Seventh lens |
| S16 | 4 | 2.9754 | 1.4875 | 70.2 | Eighth lens |
| S17 | 23.19 | Variable Interval (d3) | | | |

TABLE 4-continued

| Surface | Radius of Curvature (mm) | Interval (mm) | Refractive Index | Abbe Number | Remarks |
|---|---|---|---|---|---|
| Image Side | Infinity | | | | |

In the table 4, the radius of curvature represents a radius curvature of each surface, and the interval represents a distance between two adjacent surfaces. For example, an interval of the surface S1 represents a distance between the surface S1 and the surface S2. The thickness, the refractive index, and the Abbe number of each lens in the remark column correspond to values of the space, the refractive index, and the Abbe number in the same row. Moreover, the surfaces S1 and S2 are two surfaces of the first lens 312, the surfaces S3 and S4 are two surfaces of the second lens 314, and the surfaces S5 and S6 are two surfaces of the third lens 316a. The surface S7 and S8 are two surfaces of the infrared cut filter, and the surface S9 is a surface of the aperture stop 330. The surfaces S10 and S11 are two surfaces of the fourth lens 322, the surface S12 is a surface of the fifth lens 324 facing to the object side, the surface S13 is a contact surface between the fifth lens 324 and the sixth lens 326, the surface S14 is a surface of the sixth lens 326 facing to the image side, the surfaces S15 is a surface of the seventh lens 328 facing to the object side, the surface S16 is a contact surface between the seventh lens 328 and the eighth lens 329, and the surface S17 a surface of the eighth lens 329 facing to the image side. Similarly, when the zoom lens 400 is used for imaging, an image sensing device, for example, a CCD image sensing device or a CMOS image sensing device may be disposed at the image side.

According to the above description, the surfaces S10 and S11 are aspheric surfaces, and an equation of the aspheric surface is as follows:

$$X = \frac{(1/R)H^2}{1+\sqrt{1-(1+K)(H/R)^2}} + AH^4 + BH^6 + CH^8 + DH^{10}$$

where X is a sag along the optical axis L; R is the radius of an osculating sphere, i.e., the radius of curvature close to the optical axis L (the radius of curvatures of S10 and S11). K is a conic constant and H is an aspheric height, i.e., the height from the center to the edge of the lens. It may be known from the formula that different H values are corresponding to different X values. A, B, C, and D are aspheric coefficients. The aspheric coefficients and the K values of the surfaces S10 and S11 are shown in a following table 5:

TABLE 5

| Surface | K | A | B | C | D |
|---|---|---|---|---|---|
| S10 | 0 | −6.0401E−05 | −2.0018E−06 | 5.2062E−08 | −3.5733E−09 |
| S11 | 0 | 0.0003 | 1.0038E−06 | −7.8727E−08 | −1.5450E−09 |

TABLE 6

| | | Wide end | Middle Focal Length Region | Tele end |
|---|---|---|---|---|
| Effective Focal Length (mm) | | 3 | 7.8 | 11.2 |
| F number | | 1.3 | 2.2 | 3.4 |
| Field of View (degree) | | 125.3 | 43.8 | 30.4 |
| Variable Interval (mm) | d1 | 10.1546 | 1.5 | 2.8306 |
| | d2 | 10.2358 | 4.5436 | 0.5 |
| | d3 | 5.41 | 11.0892 | 15.1587 |

In the table 6, values of the zoom lens 400 when the focal length thereof corresponds to the wide end, middle focal length region, and the tele end are listed, and the values of the zoom lens 400 include EFL, FOV, F number, and variable intervals d1, d2, and d3.

Since the F number of the zoom lens 400 may be as small as 1.3, the zoom lens 400 has the advantage of the large aperture. Moreover, since the FOV of the zoom lens 400 at the wide end may reach 125.3, the zoom lens 400 has the advantage of the wide viewing angle.

Figure 6A:
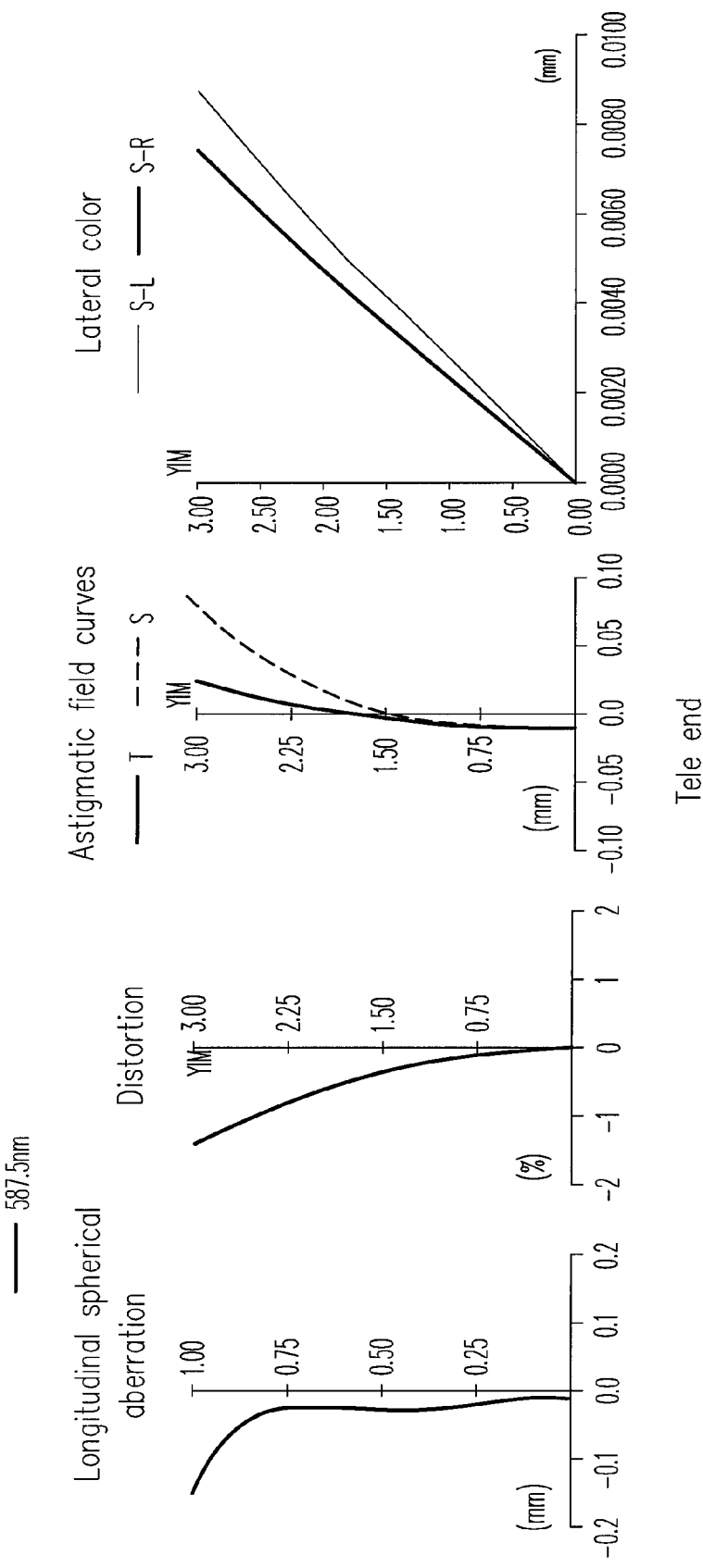
FIGS. 6A-6C are respectively optical quality reference diagrams of a zoom lens of FIG. 5A-5C in case that a focal length thereof corresponds to a tele end, a middle focal length region, and a wide end.
Figure 6B:
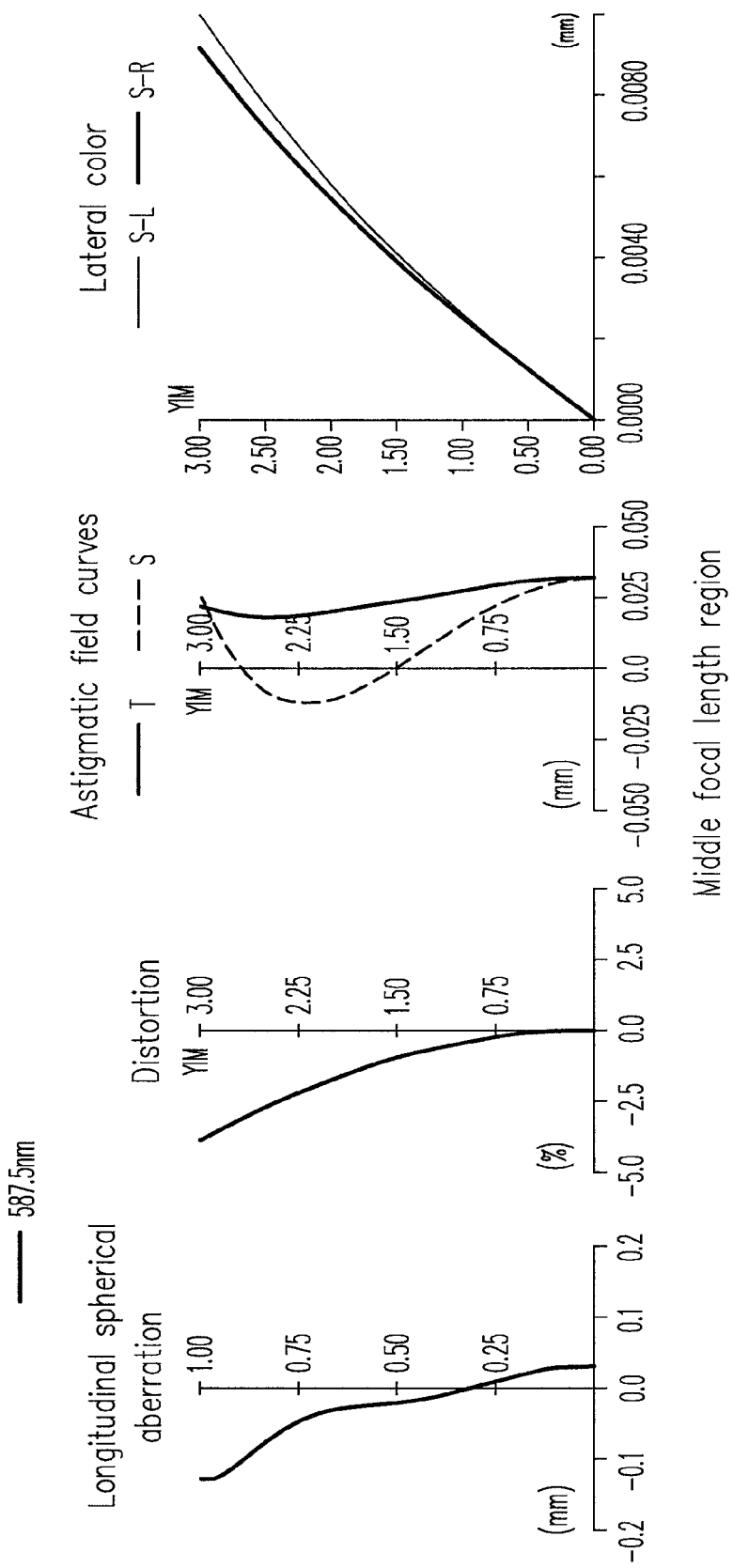
Figure 6C:
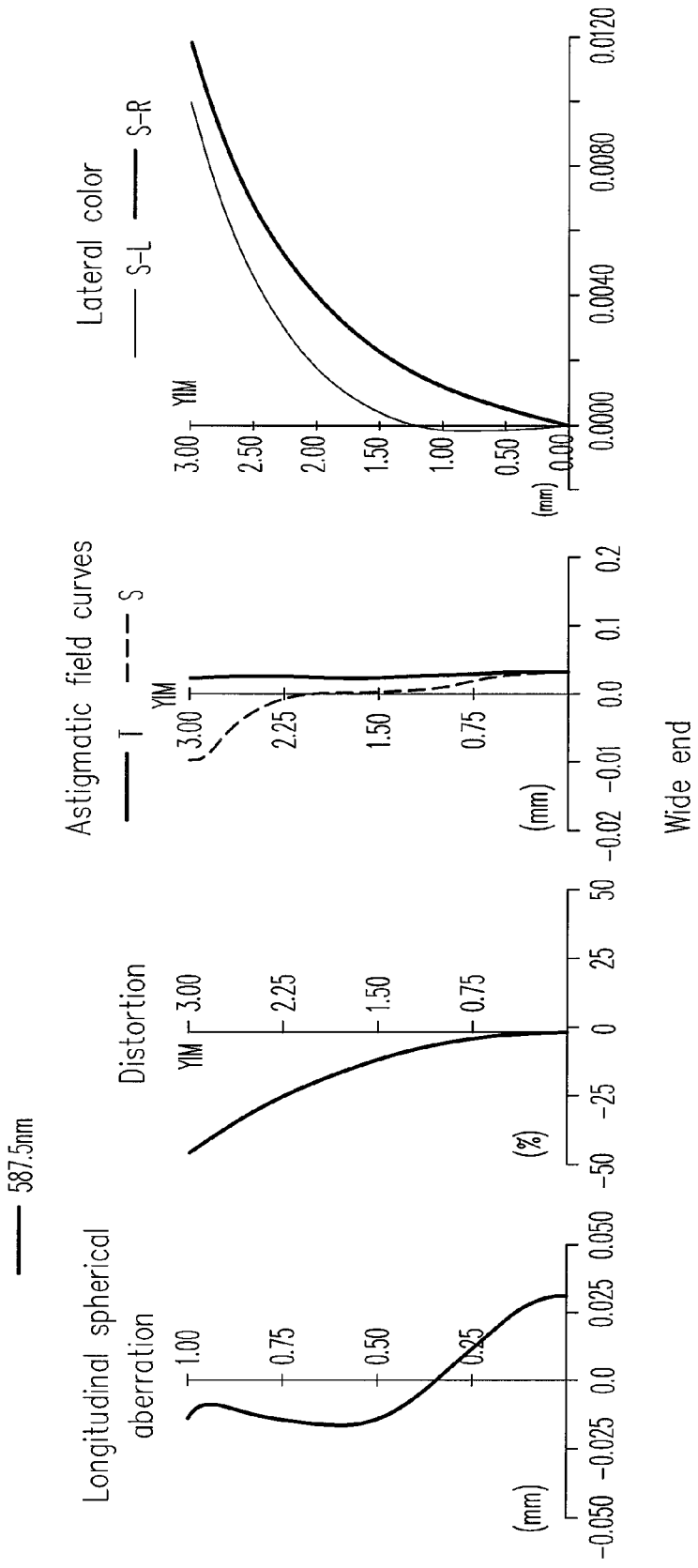

According to a longitudinal spherical aberration diagram, a distortion diagram, astigmatic field curves diagram, and a lateral color diagram of FIGS. 6A-6C, it is know that when the focal length of the focus lens 400 corresponds to the tele end, the middle focal length region, and the wide end, the zoom lens 400 all have a good imaging quality. Therefore, the zoom lens 400 of the present embodiment may have the advantages of the small size and the low cost while maintaining the fine imaging quality.

In summary, the zoom lens of the embodiment of the invention has at least one of the following advantages:

1. During the zoom process of the zoom lens of the embodiment of the invention, a position of the aperture stop is fixed, so that a design of a linking-up mechanism is relatively simple. Accordingly, not only a size of the zoom lens may be reduced, but also a production cost thereof is reduced.

2. Since a relatively less number of the aspheric lenses is used in the zoom lens of the embodiment of the invention, a cost of the aspheric lenses may be saved, and a production yield may be increased. Therefore, a production cost of the zoom lens of the embodiment of the invention is relatively low.

3. When the zoom lens of the embodiment of the invention is used for imaging under visible light and infrared light, a chromatic aberration phenomenon may be mitigated, so as to achieve a better imaging quality.

4. The zoom lens of the embodiment of the invention has advantages of a large aperture and a wide viewing angle.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens, comprising:
a first lens group, having a negative refractive power and comprising a first lens, a second lens, and a third lens arranged in order from an object side to an image side, wherein refractive powers of the first lens, the second lens, and the third lens are respectively negative, negative, and positive; and
a second lens group, having a positive refractive power and disposed between the first lens group and the image side, the second lens group comprising a fourth lens, a fifth lens, a sixth lens, a seventh lens, and an eighth lens arranged in order from the object side to the image side, wherein refractive powers of the fourth lens, the fifth lens, the sixth lens, the seventh lens, and the eighth lens are respectively positive, negative, positive, negative, and positive,
wherein an effective focal length of the first lens group is f1, an effective focal length of the second lens group is f2, the first lens group and the second lens group are capable of moving between the object side and the image side to make the zoom lens be switched between a wide end and a tele end, an effective focal length of the zoom lens is $f_w$ when the zoom lens is switched to the wide end, and $-2.8 < f1/f_w < -2.5$ and $0.75 < |f1/f2| < 0.9$.

2. The zoom lens as claimed in claim 1, wherein the first lens, the second lens, and the third lens are respectively a convex-concave lens having a convex surface facing to the object side, a biconcave lens, and a concave-convex lens having a concave surface facing to the image side.

3. The zoom lens as claimed in claim 1, wherein the first lens, the second'lens, and the third lens are respectively a convex-concave lens having a convex surface facing to the object side, a biconcave lens, and a plano-convex lens having a convex surface facing to the object side.

4. The zoom lens as claimed in claim 1, wherein the fourth lens, the fifth lens, the sixth lens, the seventh lens, and the eighth lens are respectively a biconvex lens, a convex-concave lens having a convex surface facing to the object side, a biconvex lens, a convex-concave lens having a convex surface facing to the object side, and a concave-convex lens having a concave surface facing to the image side.

5. The zoom lens as claimed in claim 1, wherein the zoom lens is switched from the tele end towards the wide end when the first lens group and the second lens group are moved far away from one another.

6. The zoom lens as claimed in claim 1, wherein the zoom lens is switched from the wide end towards the tele end when the first lens group and the second lens group are moved closer to one another.

7. The zoom lens as claimed in claim 1, wherein the first lens has a first surface facing to the object side and a second surface facing to the image side, a clear aperture of the second surface is $C_{21}$, a radius of curvature of the second surface is $R_{21}$, and $C_{21}/R_{21} \leq 0.92$.

8. The zoom lens as claimed in claim 1, wherein a ratio between an optical distortion of a 70% image height and an optical distortion of a 100% image height on an image surface located at the image side is x when the zoom lens is switched to the wide end, and $0.4 \leq x \leq 0.5$.

9. The zoom lens as claimed in claim 1, wherein a material of the first lens, the second lens, the third lens, the fourth lens, the fifth lens, the sixth lens, the seventh lens, and the eighth lens comprises glass or plastic.

10. The zoom lens as claimed in claim 1, further comprising an infrared cut filter disposed between the third lens and the fourth lens.

11. The zoom lens as claimed in claim 1, wherein the first lens, the second lens, and the third lens are each a spherical lens, and at least one of the fourth lens, the fifth lens, the six lens, the seventh lens, and the eighth lens is an aspheric lens.

12. The zoom lens as claimed in claim 11, wherein the fourth lens is the aspheric lens.

13. The zoom lens as claimed in claim 1, further comprising an aperture stop disposed between the first lens group and the second lens group, and the aperture stop having a fixed position relative to the zoom lens.

14. The zoom lens as claimed in claim 13, wherein a distance between the aperture stop and an image surface located at the image side is D, a distance between the image surface and an intersection point intersected between a surface of the first lens facing to the object side and an optical axis of the zoom lens is $T_1$ when the zoom lens is switched to the wide end, and $D/T_1 > 0.5$.

15. The zoom lens as claimed in claim 13, wherein a distance between the aperture stop and an image surface located at the image side is D, a distance between the image surface and an intersection point intersected between a surface of the first lens facing to the object side and an optical axis of the zoom lens is $T_2$ when the zoom lens is switched to the tele end, and $D/T_2 > 0.6$.

16. The zoom lens as claimed in claim 1, wherein the fifth lens and the sixth lens form a first double cemented lens.

17. The zoom lens as claimed in claim 16, wherein the Abbe number of at least one of the fifth lens and the sixth lens is greater than 80.

18. The zoom lens as claimed in claim 16, wherein the seventh lens and the eighth lens form a second double cemented lens.

19. The zoom lens as claimed in claim 18, wherein the Abbe number of at least one of the fifth lens, the sixth lens, the seventh lens, and the eighth lens is greater than 65.

* * * * *